US009963582B2

(12) United States Patent
Cuder et al.

(10) Patent No.: US 9,963,582 B2
(45) Date of Patent: May 8, 2018

(54) EXPANDABLE POLYMERIC COMPOSITION WITH IMPROVED FLEXIBILITY AND RELATIVE PREPARATION PROCESS

(71) Applicant: VERSALIS S.P.A., San Donato Milanese (IT)

(72) Inventors: Giovanni Cuder, Mantova (IT); Dario Ghidoni, Gonzaga (IT)

(73) Assignee: Versalis S.p.A., San Donato Milanese (IT)

( * ) Notice: Subject to any disclaimer, the term of this patent is extended or adjusted under 35 U.S.C. 154(b) by 0 days. days.

(21) Appl. No.: 14/647,488

(22) PCT Filed: Dec. 12, 2013

(86) PCT No.: PCT/IB2013/060871
§ 371 (c)(1),
(2) Date: May 27, 2015

(87) PCT Pub. No.: WO2014/097074
PCT Pub. Date: Jun. 26, 2014

(65) Prior Publication Data
US 2015/0299446 A1 Oct. 22, 2015

(30) Foreign Application Priority Data
Dec. 17, 2012 (IT) .............................. MI2012A2153

(51) Int. Cl.
| | | |
|---|---|---|
| *C08L 25/04* | (2006.01) | |
| *C08F 212/08* | (2006.01) | |
| *C08J 9/16* | (2006.01) | |
| *C08L 25/08* | (2006.01) | |
| *C08J 9/14* | (2006.01) | |
| *C08J 9/224* | (2006.01) | |
| *C08K 5/01* | (2006.01) | |
| *C08L 23/08* | (2006.01) | |
| *C08L 51/00* | (2006.01) | |
| *C08L 51/04* | (2006.01) | |

(52) U.S. Cl.
CPC ............ *C08L 25/04* (2013.01); *C08F 212/08* (2013.01); *C08J 9/141* (2013.01); *C08J 9/16* (2013.01); *C08J 9/224* (2013.01); *C08K 5/01* (2013.01); *C08L 23/0807* (2013.01); *C08L 25/08* (2013.01); *C08L 51/003* (2013.01); *C08L 51/04* (2013.01); *C08J 2201/03* (2013.01); *C08J 2201/036* (2013.01); *C08J 2203/14* (2013.01); *C08J 2203/182* (2013.01); *C08J 2205/06* (2013.01); *C08J 2325/06* (2013.01); *C08J 2415/00* (2013.01); *C08J 2423/08* (2013.01); *C08J 2451/04* (2013.01); *C08L 2205/03* (2013.01)

(58) Field of Classification Search
CPC ........................... C08J 2325/04–2325/18; C08J 2423/00–2423/36
See application file for complete search history.

(56) References Cited

U.S. PATENT DOCUMENTS

| | | | |
|---|---|---|---|
| 3,489,821 A | | 1/1970 | Witt et al. |
| 3,489,822 A | | 1/1970 | Witt et al. |
| 3,538,190 A | | 11/1970 | Meredith et al. |
| 3,538,191 A | | 11/1970 | Meredith et al. |
| 3,538,192 A | | 11/1970 | Bishop et al. |
| 3,642,950 A | | 2/1972 | O'shea et al. |
| 3,671,608 A | | 6/1972 | Meredith et al. |
| 3,683,050 A | | 8/1972 | Meredith et al. |
| 3,819,765 A | | 6/1974 | O'Shea |
| 3,876,727 A | | 4/1975 | Meredith et al. |
| 4,001,349 A | | 1/1977 | Severini et al. |
| 4,020,025 A | * | 4/1977 | Zeitler ................. C08J 9/0061 264/53 |
| 4,262,052 A | * | 4/1981 | Kannan ................. C08J 9/0061 428/308.4 |
| 4,340,669 A | | 7/1982 | Bauer |
| 4,636,527 A | * | 1/1987 | Suh ........................ C08J 9/127 264/50 |
| 4,650,830 A | * | 3/1987 | Yonekura .............. C08F 255/02 525/193 |

(Continued)

FOREIGN PATENT DOCUMENTS

| | | |
|---|---|---|
| DE | 2413375 | 10/1975 |
| DE | 2413408 | 10/1975 |
| DE | 3814783 | 11/1989 |
| IT | 1007901 | 10/1976 |
| WO | WO2008050909 | 5/2008 |

OTHER PUBLICATIONS

Pticek, A.; Murgic, Z.; Jelencic, J. Effect of the structure of ethylene-propylene-diene-graft-polystyrene copolymers on morphology and mechanical properties of SAN/EPDM blends. eXPRESS Polymer Letters vol. 1, No. 3 (2007) pp. 173-179.*
Welsh, GaryPolystyrene Packaging Applications: Foam Sheet and Oriented Sheet. In Modern Styrenic Polymers: Polystyrenes and Styrenic Copolymers. Edited by John Scheirs and Duane B. Priddy. 2003.*
International Search Report dated Mar. 11, 2014 for PCT/IB2013/060871.

(Continued)

Primary Examiner — Michael M Dollinger
Assistant Examiner — Christina H Wales
(74) Attorney, Agent, or Firm — Abel Law Group, LLP

(57) ABSTRACT

The present invention relates to a polymeric composition which comprises: a) vinyl aromatic polymers and/or copolymers in an amount ranging from 50% to 99% by weight, calculated with respect to the overall composition, b) a polyolefin or a relative copolymer with an ester in an amount ranging from 1% to 50% by weight, calculated with respect to the overall composition, c) olefinic elastomer grafted with a.-vinyl aromatic polymer in an amount ranging from 0.01% to 40% by weight, calculated with respect to the sum of (a)+(b), d) an expanding agent in an amount ranging from 1% to 10% by weight, calculated with respect to the sum of (a)+(b)+(c).

13 Claims, No Drawings

(56) References Cited

U.S. PATENT DOCUMENTS

| | | | | |
|---|---|---|---|---|
| 4,690,976 A | * | 9/1987 | Hahnfeld | C08L 23/02 525/240 |
| 4,716,197 A | | 12/1987 | Seiss et al. | |
| 4,849,472 A | * | 7/1989 | Biglione | C08L 25/12 521/139 |
| 4,910,254 A | | 3/1990 | Johnston | |
| 5,290,837 A | | 3/1994 | Ghidoni et al. | |
| 2004/0152795 A1 | | 8/2004 | Arch et al. | |
| 2005/0123638 A1 | | 6/2005 | Casalini | |
| 2011/0065819 A1 | | 3/2011 | Schips et al. | |

OTHER PUBLICATIONS

"La Chimica e l'Industria" vol. 47, nr. 4, 1965 and vol. 59, nr. 7,9,10, 1977.

L.H.Tung and R.M.Wiley in the Journal of Polymer Science, Polymer Physics, vol. 11, p. 1413, 1973.

S. Arrighetti, et al. "Impact Resistant Resins Based on Olefinic Terpolymers Containing a System of Conjugated Double Bonds—Influence of the terpolymer structure upon the grafting reaction of styrene and acrylonitrile onto the elastomer", La Chimica E L'Industria, vol. 59, No. 7, 1977, p. 483-488.

S. Arrighetti, et al. "Impact Resistant Resins Based on Olefinic Terpolymers Containing a System of Conjugated Double Bonds—Study of the grafting reaction", La Chimica E L'Industria, vol. 59, No. 9, 1977, p. 605-611.

5. Arrighetti, et al. Impact Resistant Resins Based on Olefinic Terpolymers Containing a System of Conjugated Double Bonds—Influence of the chemical structure of the elastomer and the morphology on the more relevant technological properties, La Chimica E L'Industria, vol. 59, No. 10, 1977, p. 685-688.

* cited by examiner

EXPANDABLE POLYMERIC COMPOSITION WITH IMPROVED FLEXIBILITY AND RELATIVE PREPARATION PROCESS

The present invention relates to expandable polymeric compositions containing vinyl aromatic polymers and/or copolymers having an enhanced flexibility, and a process for the preparation of said compositions.

In the present patent application, all the operative conditions appearing in the text should be considered as being preferred conditions, even if not expressly declared.

For the purposes of the present invention, the term "comprising" or "including" also includes the term "consisting of" or "essentially consisting of".

For the purposes of the present invention, the definition of the ranges always includes the extremes, unless otherwise specified.

Expanded foams based on polystyrene are rigid and are therefore not suitable for many applications in the field of packaging. These are foams with closed cells and consequently their low elasticity represents a considerable disadvantage in many applications as they are not able to provide adequate protection for the packaged articles against impact. Moulded end-products in polystyrene-based foams are also subject to breakage even as a result of small deformations, preventing their subsequent use due to the damage suffered.

Expandable blends of styrene polymers with polyolefins and possible compatibilizing agents are known in the art. Hydrogenated styrene-butadiene block copolymers are used, for example (DE 2,413,375, DE 2,413,408 or DE 3,814.783). Also the foams obtained with these blends have improved mechanical properties with respect to those prepared with styrene polymers alone, in particular an improved elasticity and a reduced fragility at low temperatures. Also the chemical resistance to solvents such as aromatic compounds (toluene, for example) or esters is better than that of styrene polymer foams. The expandability of these blends, however, is inadequate due to their short shelf life, i.e. they rapidly lose the expanding agent, consequently making it extremely difficult to reach the required densities.

The production of elastic foams is also known, using interpenetrating polymers prepared through the polymerization of styrene in the presence of polyolefins in aqueous suspension, thus forming an interpenetrating lattice composed of styrene polymers and polyolefin polymers (US 2004/0152795). Also in this case, however, the expanding agent is rapidly diffused outside the beads of the material and must therefore be stored at low temperatures. Furthermore, its processability is limited to short periods of time.

WO 2008/050909 describes interpenetrated elastic foams having a core-shell structure in which, under a shell of polyolefin, there is a core of interpenetrated polystyrene-polyolefin polymers. The elasticity and fracture resistance are better than those of polystyrene and are normally used for packaging in the transport industry or as shock-absorbers in cars. Also in this case, the shelf life at room temperature is short.

The known elastic foams composed, for example, of polyolefins, expandable interpenetrating polymers, have a poor compatibility with expanded EPS beads, when mixed even in small quantities, producing fragile end-products.

US 2011/0065819 describes expandable elastic polymers comprising:

1-45% of polyolefins
   0-25% of polyolefins having a melting point lower than 105° C.
0.1-9.9% of styrene-butadiene copolymers
0.1-9.89% of styrene-ethylene copolymers wherein the dispersed phase has a diameter ranging from 1 to 1,500 nm. The product has optimum elastic properties, a long shelf life and is compatible with standard EPS. Its preparation by means of extrusion or continuous mass is difficult, however, as the high temperatures used for the extrusion can damage (for example by crosslinking) the styrene-butadiene copolymers, due to the double bonds.

The objective of the present invention is to provide expandable elastic polymeric compositions, which can guarantee a long shell life, with a low loss of expanding agent and an easy processability reaching low densities.

For this purpose the Applicant has surprisingly found that the incorporation of olefinic elastomers grafted with vinyl aromatic polymers, in combination with a polyolefin, give the resulting polymeric compositions optimum elasticity properties (cushioning).

An embodiment of the present invention therefore relates to a polymeric composition comprising:
a) vinyl aromatic polymers and/or copolymers in an amount ranging from 50% to 99% by weight, calculated with respect to the overall composition,
b) a polyolefin or a relative copolymer with an ester in an amount ranging from 1% to 50% by weight calculated with respect to the overall composition,
c) an olefinic elastomer grafted with a vinyl aromatic polymer in an amount ranging from 0.01% to 40% by weight, calculated with respect to the sum of a)+b),
d) an expanding agent in an amount ranging from 1 to 10% by weight, calculated with respect to the sum of a)+b)+c).

Said compositions have an optimum elasticity, a high fracture resistance and shock absorption, combined with a good rigidity. A further advantage of these compositions is their compatibility with conventional vinyl aromatic polymers (EPS, for example) with which they can be mixed and easily processed in order to obtain end-products having good mechanical properties.

DETAILED DESCRIPTION

An object of the present invention relates to a polymeric composition which comprises:
a) vinyl aromatic polymers and/or (co)polymers in an amount ranging from 50% to 99% by weight, calculated with respect to the overall composition,
b) a polyolefin or a relative copolymer with an ester in an amount ranging from 1% to 50% by weight calculated with respect to the overall composition,
c) an olefinic elastomer grafted with a vinyl aromatic polymer in an amount ranging from 0.01% to 40% by weight, calculated with respect to the sum of a)+b),
d) an expanding agent in an amount ranging from 1 to 10% by weight, calculated with respect to the sum of a)+b)+c).

A low loss of expanding agent is obtained when components (a) and (b) are dispersed with an average diameter ranging from 10 to 2,000 nm, preferably from 100 to 1,000 nm. Dispersions having diameters higher than 2,000 nm cause a more rapid loss of the expanding agent.

The terms vinyl aromatic polymers and/or copolymers (a) in the present text refer to polymeric products having a weight average molecular weight ($M_w$) ranging from 50,000 to 300,000, preferably from 70,000 to 220,000. Said vinyl aromatic polymers can be obtained by the polymerization of a mixture of monomers comprising from 50% to 100% by weight, preferably from 75% to 98% by weight of one or more vinyl aromatic monomers and at least one monomer copolymerizable with vinyl aromatic monomers, homogeneously englobed in the polymer in an amount ranging from 0% to 50% by weight, preferably from 2% to 25% by weight.

The vinyl aromatic monomers can be selected from those corresponding to the following general formula (I):

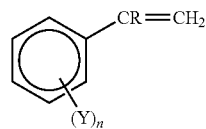

wherein R is a hydrogen or methyl group, n is zero or an integer ranging from 1 to 5 and Y a halogen, preferably selected from chlorine or bromine, or an alkyl or alkoxyl radical having from 1 to 4 carbon atoms. Vinyl aromatic monomers having general formula (I) can be selected from: styrene, α-methylstyrene, methylstyrene, ethylstyrene, butylstyrene, dimethylstyrene, mono-, di-, tri-, tetra-, and penta-chlorostyrene, bromostyrene, methoxy-styrene, acetoxy-styrene. Preferred vinyl aromatic monomers are styrene and α-methylstyrene. The vinyl aromatic monomers having the general formula (I) can be used alone or in a mixture up to 50% by weight, preferably from 2% to 25% by weight, with other copolymerizable monomers. Examples of these monomers are (meth)acrylic acid, $C_1$-$C_4$ alkyl esters of (meth)acrylic acid such as methyl acrylate, methyl methacrylate, ethyl acrylate, ethyl methacrylate, isopropyl acrylate, butyl acrylate, amides and nitriles of (meth)acrylic acid, such as acrylamide, methacrylamide, acrylonitrile, methacrylonitrile, butadiene, ethylene, divinyl benzene, maleic anhydride. Preferred copolymerizable monomers are acrylonitrile and methylmethacrylate.

The polyolefin (b) is present in an amount ranging from 1% to 50% by weight, preferably from 10% to 30% by weight, in order to obtain an optimum elasticity but without excessively reducing the rigidity.

The polyolefins (b) which can be used in the present invention are well known in the art. They can include all polymers of ethylene, propylene, butene, and copolymers of these monomers also with a vinyl ester, preferably vinyl acetate (EVA), butyl acrylate, ethyl acrylate or hexyl acrylate. Polyethylene refers to any ethylene polymer having a density ranging from 0.90 to 0.97 g/cm$^3$, among which those known as linear low density polyethylene (LLDPE) and high density polyethylene (HDPE). These polymers are known on the market under the trade-name, for example, of Flexirene of the company Versalis, Escorene LL1201 (LLDPE) of the company Exxon, Riblene (LDPE) of the company Versalis, Eraclene (HDPE) of Versalis. Other polyolefins such as propylene, polybutene, polymethylpentene, and relative copolymers of two or more α-olefins, such as, for example, ethylene-propylene, can be used. Ethylene-acrylic ester copolymers such as ethylene-vinyl acetate (EVA) can also be used. The vinyl acetate content can range from 0.5% up to 40%, typically from 10 to 35%. These copolymers are known on the market under their trade-name, for example Greenflex of the company Versalis.

The olefinic elastomer contains, grafted thereon, a vinyl aromatic polymer. The molar ratio between the vinyl aromatic polymer and olefinic elastomer is preferably higher than 0.8, more preferably between 1 and 2.

The olefinic elastomer which forms the substrate on which the vinyl aromatic polymer is grafted, is a rubbery copolymer having a Mooney viscosity ranging from 10 to 150 ML-4 at 100° C. This rubbery copolymer is composed of at least two different a mono-olefins, each having a linear olefinic chain, with at least another copolymerizable monomer. This linear chain may preferably be composed of ethylene and propylene; other combinations are possible, in pairs, between the following olefins: ethylene, propylene, butene-1, octane-1 and other olefins. Said copolymerizable monomer is generally a polyene, typically a non-conjugated diene.

Preferably one of the a mono-olefins is ethylene together with another α-mono-olefin.

The weight ratio of ethylene with respect to the other α mono-olefin usually ranges from 20/80 to 80/20.

Copolymers particularly preferred are ethylene/propylene/non-conjugated diene terpolymers, wherein the non-conjugated diene can be cyclic or acyclic, such as, preferably, 5-methylene-e-norbornene; 5-ethylidene-2-norbornene; 5-isopropylene-2-norbornene; pentadiene-1,4; hexadiene-1,4; hexadiene-1,5, heptadiene-1,5; dodecatriene-I,7,9; methyl-heptadiene-1,5; norbornadiene-2,5; cyclo-octadiene-1,5; dicyclopentadiene; tetrahydroindene; 5-methyl-tetrahydroindene. The diene content ranges from about 2% to 20% by weight, preferably from 8% to 18% by weight of the monomeric diene units in the elastomeric terpolymer.

Particularly interesting results, in terms of dispersion, have been obtained using an elastomeric terpolymer having a Mooney viscosity (ML-4) at 100° C. ranging from 30 to 90 and an iodine number greater than 5, preferably from 10 to 40. Dispersions are obtained with this terpolymer, ranging from 10 nm to 2,000 nm, which, as previously indicated, allow the dispersion of the expanding agent to be reduced/decelerated.

The grafting reaction of the vinyl aromatic polymer on the elastomeric substrate can be carried out using any grafting technique known in the art.

The olefinic elastomer can thus be mixed with the vinyl aromatic monomer or monomers following a well-known polymerization process, such as a mass, suspension or mass-suspension process. In general, the grafting reaction can be radical, thermal, chemical or by radiation and can be initiated anionically or by Friedel-Crafts. Grafting techniques of vinyl aromatic monomers on the olefinic substrate are well-known and are described, for example, in U.S. Pat. No. 3,489,822; U.S. Pat. No. 3,489,821; U.S. Pat. No. 3,642,950; U.S. Pat. No. 3,819,765; U.S. Pat. No. 3,538,190; U.S. Pat. No. 3,538,191; U.S. Pat. No. 3,538,192; U.S. Pat. No. 3,671,608; U.S. Pat. No. 3,683,050; U.S. Pat. No. 3,876,727; U.S. Pat. No. 4,340,669. Obviously, in the grafting polymerization, not all of the vinyl aromatic monomer is grafted on the elastomer; a part of the monomer forms a free polymer which is present in a physical mixture with the grafted polymer. The molecular weight of the grafted vinyl aromatic polymer is preferably almost equal to that of the non-grafted polymer. In order to reach the objective of the present invention, as mentioned above, the molar ratio of the vinyl aromatic polymer/olefinic elastomer in the grafted phase must be higher than 0.8, preferably from 1 to 2.

This ratio can be regulated by carrying out the grafting polymerization of the vinyl aromatic monomer on the olefinic elastomer in the presence of various quantities of initiator, solvent and/or chain transfer agent, as described in Italian patent 1,007,901, or in "La Chimica e l'Industria" vol. 47, nr. 4, 1965 and vol. 59, nr. 7, 9, 10, 1977.

The molecular weight of the vinyl aromatic polymer grafted on the olefin substrate, can influence the properties of the composition; the best results in terms of dispersion are obtained with vinyl aromatic polymers grafted on the olefinic substrate having a molecular weight higher than 50,000 and up to 500,000 and, preferably, a molecular weight almost the same as that of the vinyl aromatic polymer of component (a).

The grafted olefinic elastomer (c) ranges from 0.01 to 40%, more preferably from 1 to 30% and has the function of guaranteeing the optimal dispersion of the polyolefin and consequently a long shelf life.

Any expanding agent (d) capable of being incorporated in a polymer can be used in the present invention. Preferably the expanding agents can be liquid substances with a boiling point ranging from 10° C. to 80° C., preferably from 20° C. to 60° C. Preferred expanding agents are aliphatic or cycloaliphatic hydrocarbons containing from 3 to 6 carbon atoms, such as n-pentane i-pentane, cyclo-pentane, butane, isobutane or mixtures thereof, halogenated derivatives of aliphatic hydrocarbons containing from 1 to 3 carbon atoms, such as dichlorodifluoromethane, 1,2,2-trifluoroethane and 1,1,2-trifluoroethane; carbon dioxide.

The expanding agent is present in a variable quantity, ranging from 1% to 10% by weight, preferably from 4 to 6%, said quantity calculated with respect to components (a)+(b)+(c).

In any case, the compositions object of the present invention can be prepared in continuous mass, by extrusion and also by suspension or by post-impregnation. The continuous mass technology is preferable. Another advantage of the present invention is the easy preparation by extrusion, as the hydrogenated elastomer of the present invention is stable at high temperatures.

A further object of the present invention relates to a process for preparing, in continuous mass, the expandable composition described and claimed in the present text. Said process comprises the following phases:
i) if the polymer and/or copolymer (a) is in granules:
  1. heating said polymer and/or copolymer to a temperature higher than the relative melting point together with a polyolefin (b) in an amount ranging from 1% to 50% by weight, and a grafted olefinic elastomer (c) in an amount ranging from 0.01% to 40% by weight, so as to form a polymeric composition in the molten state;
  2. subsequently incorporating an expanding agent in said polymeric composition in the molten state;
ii) if the polymer and/or copolymer (a) is already in the molten state, adding a polyolefin (b) in an amount ranging from 1% to 50% by weight, a grafted olefinic elastomer (c) in an amount ranging from 0.01% to 40% by weight and then incorporating an expanding agent so as to form a polymeric composition.

All known expansion techniques can be applied, from vapour expansion to that with hot air.

The expandable compositions described and claimed in the present text, after expansion, form expanded or moulded foams.

EXAMPLES

Example 1—Preparation of the Grafted Olefinic Elastomer A: EPDM Grafted on Polystyrene The olefinic elastomer A has the following composition: 50% by weight of EPDM (Mooney viscosity of 62-72 ML-4 at 100° C. and an iodine index of 18), 42% by weight of grafted polystyrene and 8% by weight of free polystyrene having a molecular weight (Mw) of 273,000, wherein the molar ratio polystyrene/elastomer in the grafted phase is 1.14. The molar ratio polystyrene/elastomer in the olefinic elastomer A is measured by first removing all the impurities, consequently leaving only polystyrene (both free and grafted) and EPDM (both free and grafted). For this purpose, 5 g of olefinic elastomer A are dissolved in 5 ml of toluene and 3 ml of acetone are then added to the solution. The polymers are subsequently precipitated by slowly adding 10 ml of 2-propanol. The mixture is then centrifuged and the limpid solvent is decanted from the precipitate and eliminated. The free polystyrene is subsequently separated from the EPDM and from the grafted copolymers by means of selective precipitation. For this purpose, the precipitate first collected is dissolved in 5 ml of toluene. 7 ml of a solution of methylethylketone/acetone (1:1 by volume) are then slowly added, under stirring, until an extremely fine dispersion has been prepared. Approximately 15 ml of a solution of methanol/methylethylketone/acetone (1:2:2 by volume) are subsequently slowly added, under constant stirring, until the coagulation of a white precipitate has initiated. The mixture is centrifuged and the limpid supernatant is decanted from the precipitate. The liquid supernatant contains free polystyrene which can be characterized by means of GPC. The precipitate contains both free EPDM and that grafted on the polystyrene. The grafted product/rubber ratio can be measured by means of infrared spectroscopy. The % of rubber which is grafted with the polystyrene is that calculated by means of a statistical method using the grafted product/rubber ratio, the molecular weight of the EPDM rubber and the molecular weight of the polystyrene, assuming that the free polystyrene and that grafted have the same molecular weight. This statistical method is described by L. H. Tung and R. M. Wiley in the Journal of Polymer Science, Polymer Physics, Volume 11, page 1413, 1973.

Example 2—Preparation of the Grafted Olefinic Elastomer B: EPDM Grafted on Polystyrene The olefinic elastomer B has the following composition: 50% by weight of EPDM (Mooney viscosity of 62-72 ML-4 at 100° C. and an iodine index of 18), 28% by weight of grafted polystyrene and 22% by weight of free polystyrene having a molecular weight (Mw) of 207,000, wherein the molar ratio polystyrene/elastomer in the grafted phase is 1.1.

Comparative Example 89.8 parts of ethylbenzene, 852.8 parts of styrene, 56.2 parts of α-methylstyrene, 0.2 parts of divinylbenzene (total: 1,000 parts) are fed into a stirred reactor. The reaction is carried out at 125° C. with an average residence time of 2 hours.

The outgoing fluid composition is then fed to a second reactor in which the reaction is completed at 135° C. with an average residence time of 2 hours. The reactive polymeric composition, having a conversion of 72%, is heated to 240° C. and subsequently fed to the devolatilizer for removing the solvent and residual monomer. The resulting composition has a glass transition temperature of 104° C., a Melt Flow Index (MFI 200° C., 5 kg) of 8 g/10', a molecular weight MW of 200,000 g/mol and a MW/Mn ratio of 2.8, wherein MW is the weight average molecular weight and Mn is the number average molecular weight.

The composition thus obtained is collected in a heated tank and fed to a heat exchanger to lower its temperature to 190° C. (main stream).

500 parts of polystyrene N2982 (Versalis) and 500 parts of Flexirene CM50 (LLDPE sold by Versalis) are fed to a twin-screw extruder. This polymeric composition forms the side stream.

A gear pump increases the pressure of the molten polymeric composition to 260 bar.

600 parts of the polymeric composition forming the polymeric side stream are added to 400 parts of the composition coming from the heat exchanger (main stream).

The mixing is completed by means of static mixers, at a temperature of about 190° C. 65 parts of a mixture of n-pentane (75%) and iso-pentane (25%) are then pressurized and injected into the polymer in the molten state.

The ingredients are then mixed by means of static mixing elements for a calculated average time (residence) of 7 minutes. The composition is then distributed to the die, where it is extruded through a number of holes having a diameter of 0.5 mm, immediately cooled with a jet of water and cut with a series of rotating blades (according to patent application US 2005/0123638). The pelletisation pressure is 5 bar and the shear rate is selected so as to obtain granules having an average diameter of 1.2 mm. Water is used as a spray liquid and nitrogen as carrier gas. The ratio between the flow-rate of the water sprayed and the flow-rate of the polymeric mass is 30 and that between the nitrogen and polymeric mass is 20. The temperature of the water is 40° C.

The resulting granulated beads are dried with a centrifugal drier and then covered with a coating. The coating is prepared by adding to the same 3 parts of glyceryl monostearate, 1 part of zinc stearate and 0.2 parts of glycerine per 1,000 parts of dried granulated beads. The additives of the coating are mixed with the granulate by means of a continuous screw mixer.

Some of the beads were cut and analyzed using an electronic microscope in order to evaluate the diameter of the dispersed olefinic phase, which proved to range from 5,000 to 20,000 nm.

The beads were then expanded and moulded at 19 g/l. The end-products were then introduced into an oven at 70° C. for two days: test-samples were subsequently collected (100× 100×50 mm) for the compression and flexural test.

Some of the expandable beads were divided into two equal parts. The pentane value was analyzed on one part, and proved to be 5.9%. The other part was sealed in a polyethylene bag and kept at 23° C. for 15 days. The pentane content decreased considerably (2%).

The mechanical compression characteristics were tested with a Zwick I 2020 tensiometer, according to the method EN 826. Two test-samples were tested at 5 mm/min. The average load at 10% of compression proved to be 85 Kpa (pressure at which the test-sample is deformed). The maximum flexural load, measured according to the method EN 12089 proved to be 250 KPa. In this respect, see Table 1.

Example 3

89.8 parts of ethylbenzene, 852.8 parts of styrene, 56.2 parts of α-methylstyrene, 0.2 parts of divinylbenzene (total: 1,000 parts) are fed into a stirred reactor. The reaction is carried out at 125° C. with an average residence time of 2 hours.

The outgoing fluid composition is then fed to a second reactor in which the reaction is completed at 135° C. with an average residence time of 2 hours. The reactive polymeric composition, having a conversion of 72%, is heated to 240° C. and subsequently fed to the devolatilizer for removing the solvent and residual monomer. The resulting composition has a glass transition temperature of 104° C., a Melt Flow Index (MFI 200° C., 5 kg) of 8 g/10', a molecular weight MW of 200,000 g/mol and a MW/Mn ratio of 2.8, wherein MW is the weight average molecular weight and Mn is the number average molecular weight.

The composition thus obtained is collected in a heated tank and fed to a heat exchanger to lower its temperature to 190° C. (main stream).

333 parts of polystyrene N2982 (Versalis), 500 parts of Flexirene CM50 (LLDPE sold by Versalis) and 167 parts of the grafted olefinic styrene elastomer A are fed to a twin-screw extruder. This polymeric composition forms the side stream.

A gear pump increases the pressure of the molten polymeric composition to 260 bar.

600 parts of the polymeric composition forming the polymeric side stream are added to 400 parts of the composition coming from the heat exchanger (main stream).

The mixing is completed by means of static mixers, at a temperature of about 190° C. 65 parts of a mixture of n-pentane (75%) and iso-pentane (25%) are then pressurized and injected into the polymer in the molten state.

The ingredients are then mixed by means of static mixing elements for a calculated average time (residence) of 7 minutes. The composition is then distributed to the die, where it is extruded through a number of holes having a diameter of 0.5 mm, immediately cooled with a jet of water and cut with a series of rotating blades (according to patent application US 2005/0123638). The granulation pressure is 5 bar and the shear rate is selected so as to obtain granules having an average diameter of 1.2 mm. Water is used as a spray liquid and nitrogen as carrier gas. The ratio between the flow-rate of the water sprayed and the flow-rate of the polymeric mass is 30 and that between the nitrogen and polymeric mass is 20. The temperature of the water is 40° C.

The resulting granulated beads are dried with a centrifugal drier and then covered with a coating. The coating is prepared by adding to the same 3 parts of glyceryl monostearate, 1 part of zinc stearate and 0.2 parts of glycerine per 1,000 parts of dried granulated beads. The additives of the coating are mixed with the granulate by means of a continuous screw mixer. Some of the beads were cut and analyzed using an electronic microscope in order to evaluate the diameter of the dispersed olefinic phase, which proved to range from 900 to 1,200 nm.

Some of the expandable beads were divided into two equal parts. The pentane value was analyzed on one part, and proved to be 6.2%. The other part was sealed in a polyethylene bag and kept at 23° C. for 15 days. The pentane content proved to be 5.9%.

The beads were then expanded and moulded at 19 g/l. The end-products were then introduced into an oven at 70° C. for two days: test-samples were subsequently collected (100× 100×50 mm) for the compression and flexural test. The average load at 10% of compression proved to be 80 Kpa (pressure at which the test-sample is deformed). The maximum flexural load, measured according to the method EN 12089 proved to be 235 KPa. In this respect, see Table 1.

Example 4

Example 1 was repeated, substituting the polyolefin with an equal quantity of Greenflex HN70 (EVA copolymer at 30% of vinylacetate sold by Versalis). Some of the beads were cut and analyzed using an electronic microscope in order to evaluate the diameter of the dispersed olefinic phase, which proved to range from 800 to 1,000 nm.

Some of the expandable beads were divided into two equal parts. The pentane value was analyzed on one part, and proved to be 6.1%. The other part was sealed in a polyethylene bag and kept at 23° C. for 15 days. The pentane content proved to be 5.8%.

The beads were then expanded and moulded at 19 g/l. The end-products were then introduced into an oven at 70° C. for two days: test-samples were subsequently collected (100× 100×50 mm) for the compression and flexural test. The average load at 10% of compression proved to be 78 Kpa (pressure at which the test-sample is deformed). The maximum flexural load, measured according to the method EN 12089 proved to be 230 KPa. In this respect, see Table 1.

Example 5

Example 1 was repeated, substituting the grafted styrene elastomer A with an equal quantity of grafted styrene elastomer B. Some of the beads were cut and analyzed using an electronic microscope in order to evaluate the diameter of the dispersed olefinic phase, which proved to range from 1,000 to 1,300 nm.

Some of the expandable beads were divided into two equal parts. The pentane value was analyzed on one part, and proved to be 6.2%. The other part was sealed in a polyethylene bag and kept at 23° C. for 15 days. The pentane content proved to be 6.1%.

The beads were then expanded and moulded at 19 g/l. The end-products were then introduced into an oven at 70° C. for two days: test-samples were subsequently collected (100× 100×50 mm) for the compression and flexural test. The average load at 10% of compression proved to be 82 Kpa (pressure at which the test-sample is deformed). The maximum flexural load, measured according to the method EN 12089 proved to be 240 KPa. In this respect, see Table 1.

In Table 1, the density of the samples varies within the range of 19-20 g/l, Polyolefin 1 is LLDPE, Polyolefin 2 is EVA (30% VA).

TABLE 1

| Formulation | Polystyrene (%) | Polyolefin 1 (%) | Polyolefin 2 (%) | Grafted styrene elastomer A (%) | Grafted styrene elastomer B (%) | Sintering (%) | Compression strength at 10% | Flexural strength (KPa) | Residual pentane after 15 days (%) |
|---|---|---|---|---|---|---|---|---|---|
| Comparative | 70 | 30 | — | — | — | 5 | 85 | 250 | 2 |
| Example 3 | 60 | 30 | — | 10 | — | 70 | 80 | 235 | 5.9 |
| Example 4 | 60 | — | 30 | 10 | — | 80 | 78 | 230 | 5.8 |
| Example 5 | 60 | 30 | — | — | 10 | 65 | 82 | 240 | 6.1 |

The invention claimed is:

1. A polymeric composition which comprises:
   a) vinyl aromatic polymers and/or copolymers in an amount ranging from 50% to 99% by weight, calculated with respect to the overall composition,
   b) a polyolefin or a polyolefin copolymer with an ester in an amount ranging from 1% to 50% by weight, calculated with respect to the overall composition,
   c) an olefinic elastomer grafted with a vinyl aromatic polymer in an amount ranging from 0.01% to 40% by weight, calculated with respect to the sum of (a)+(b),
   d) an expanding agent in an amount ranging from 1% to 10% by weight, calculated with respect to the sum of (a)+(b)+(c), wherein components (a) and (b) are dispersed with an average diameter ranging from 10 to 2000 nm.

2. The polymeric composition according to claim 1, wherein the molar ratio between the vinyl aromatic polymer and the olefinic elastomer in the grafted olefinic elastomer is higher than 0.8.

3. The polymeric composition according to claim 2, wherein the molar ratio between the vinyl aromatic polymer and the olefinic elastomer in the grafted olefinic elastomer ranges from 1 to 2.

4. The polymeric composition according to claim 1, wherein the polyolefin is present in an amount ranging from 1% to 50% by weight.

5. The polymeric composition according to claim 1, wherein the polyolefin is present in an amount ranging from 10% to 30% by weight.

6. The polymeric composition according to claim 1, wherein, in the olefinic elastomer grafted with the vinyl aromatic polymer (c), an alpha mono olefin forming it is ethylene.

7. The polymeric composition according to claim 1, wherein the grafted olefinic elastomer (c) is an elastomeric terpolymer with a Mooney viscosity, determined at 100° C., which varies within the range of 30 to 90, and an iodine number higher than 5.

8. The polymeric composition according to claim 1, wherein the vinyl aromatic polymers grafted on the olefinic elastomer have a molecular weight ranging from 50,000 to 500,000.

9. The polymeric composition according to claim 1, wherein the molecular weight of the vinyl aromatic polymer grafted on the olefinic elastomer is equal to that of the vinyl aromatic polymer of component (a).

10. The polymeric composition according to claim 1, wherein the polyolefin is an ethylene polymer having a density ranging from 0.90 to 0.97 $g/cm^3$.

11. The polymeric composition according to claim 1, wherein the polyolefin is a copolymer of ethylene with a vinyl ester.

12. A process for preparing, in continuous mass, the polymeric composition according to claim 1, which comprises the following steps:
   i) if said vinyl aromatic polymer and/or copolymer (a) is in granules:
      1. heating said vinyl aromatic polymer and/or copolymer to a temperature higher than the relative melting point together with said polyolefin or polyolefin copolymer (b) in the amount ranging from 1% to 50% by weight, and said olefinic elastomer grafted with said vinyl aromatic polymer (c) in the amount ranging from 0.01% to 40% by weight, so as to form a polymeric composition in the molten state;

2. subsequently incorporating said expanding agent in said polymeric composition in the molten state;

ii) if said vinyl aromatic polymer and/or copolymer (a) is already in the molten state, adding said polyolefin or polyolefin copolymer (b) in the amount ranging from 1% to 50% by weight, said olefinic elastomer grafted with said vinyl aromatic polymer (c) in the amount ranging from 0.01% to 40% by weight and then incorporating said expanding agent so as to form the polymeric composition.

13. A polymeric composition which comprises:

a) vinyl aromatic polymers and/or copolymers in an amount ranging from 50% to 99% by weight, calculated with respect to the overall composition, b) a copolymer of ethylene with a vinyl ester in an amount ranging from 1% to 50% by weight, calculated with respect to the overall composition, c) an olefinic elastomer grafted with a vinyl aromatic polymer in an amount ranging from 0.01% to 40% by weight, calculated with respect to the sum of (a)+(b), d) an expanding agent in an amount ranging from 1% to 10% by weight, calculated with respect to the sum of (a)+(b)+(c).

* * * * *